(12) United States Patent
Ghorbani et al.

(10) Patent No.: US 11,829,442 B2
(45) Date of Patent: Nov. 28, 2023

(54) METHODS AND SYSTEMS FOR EFFICIENT BATCH ACTIVE LEARNING OF A DEEP NEURAL NETWORK

(71) Applicant: salesforce.com, inc., San Francisco, CA (US)

(72) Inventors: Amirata Ghorbani, Palo Alto, CA (US); Carlos Andres Esteva, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 346 days.

(21) Appl. No.: 17/151,461

(22) Filed: Jan. 18, 2021

(65) Prior Publication Data
US 2022/0156519 A1  May 19, 2022

Related U.S. Application Data

(60) Provisional application No. 63/114,467, filed on Nov. 16, 2020.

(51) Int. Cl.
*G06F 18/214* (2023.01)
*G06F 17/18* (2006.01)
*G06N 3/08* (2023.01)

(52) U.S. Cl.
CPC .......... *G06F 18/2148* (2023.01); *G06F 17/18* (2013.01); *G06F 18/2155* (2023.01); *G06N 3/08* (2013.01)

(58) Field of Classification Search
CPC .. G06F 18/2148; G06F 18/2155; G06F 17/18; G06N 3/08
See application file for complete search history.

(56) References Cited

U.S. PATENT DOCUMENTS

| | | | |
|---|---|---|---|
| 10,282,663 B2 | 5/2019 | Socher et al. |
| 10,346,721 B2 | 7/2019 | Albright et al. |
| 10,474,709 B2 | 11/2019 | Paulus |
| 10,521,465 B2 | 12/2019 | Paulus |
| 10,542,270 B2 | 1/2020 | Zhou et al. |
| 10,546,217 B2 | 1/2020 | Albright et al. |
| 10,558,750 B2 | 2/2020 | Lu et al. |
| 10,565,305 B2 | 2/2020 | Lu et al. |
| 10,565,306 B2 | 2/2020 | Lu et al. |
| 10,565,318 B2 | 2/2020 | Bradbury |

(Continued)

OTHER PUBLICATIONS

Ghorbani et al., "A Distributional Framework for Data Valuation," arXiv preprint arXiv:2002.12334, 31 pages, 2020.

(Continued)

*Primary Examiner* — Qun Shen
(74) *Attorney, Agent, or Firm* — HAYNES AND BOONE LLP

(57) ABSTRACT

Some embodiments of the current disclosure disclose methods and systems for batch active learning using the Shapley values of data points. In some embodiments, Shapley values of a first subset of labeled data are used to measure the contributions of the first subset of data to the performance of neural network. Further, a regression model that correlates the first subset of data to their Shapley values is trained to predict the Shapley values of a second subset of data that are unlabeled. A portion of the second subset of data may then be selected for labeling based on the predicted Shapley values.

21 Claims, 8 Drawing Sheets

(56) References Cited

U.S. PATENT DOCUMENTS

| | | | |
|---|---|---|---|
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,699,060 B2 | 6/2020 | Mccann | |
| 10,747,761 B2 | 8/2020 | Zhong et al. | |
| 10,776,581 B2 | 9/2020 | Mccann et al. | |
| 10,783,875 B2 | 9/2020 | Hosseini-Asl et al. | |
| 10,817,650 B2 | 10/2020 | Mccann et al. | |
| 10,839,284 B2 | 11/2020 | Hashimoto et al. | |
| 10,846,478 B2 | 11/2020 | Lu et al. | |
| 10,902,289 B2 | 1/2021 | Gao et al. | |
| 10,909,157 B2 | 2/2021 | Paulus et al. | |
| 10,929,607 B2 | 2/2021 | Zhong et al. | |
| 10,958,925 B2 | 3/2021 | Zhou et al. | |
| 10,963,652 B2 | 3/2021 | Hashimoto et al. | |
| 10,963,782 B2 | 3/2021 | Xiong et al. | |
| 10,970,486 B2 | 4/2021 | Machado et al. | |
| 11,120,364 B1* | 9/2021 | Gokalp | G06N 20/00 |
| 2013/0254153 A1* | 9/2013 | Marcheret | G06N 7/00 706/59 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0096219 A1 | 4/2018 | Socher | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0268287 A1 | 9/2018 | Johansen et al. | |
| 2018/0268298 A1 | 9/2018 | Johansen et al. | |
| 2018/0336453 A1 | 11/2018 | Merity et al. | |
| 2018/0373987 A1 | 12/2018 | Zhang et al. | |
| 2019/0108651 A1* | 4/2019 | Gu | G06T 7/80 |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258939 A1 | 8/2019 | Min et al. | |
| 2019/0286073 A1 | 9/2019 | Asl et al. | |
| 2019/0355270 A1 | 11/2019 | Mccann et al. | |
| 2019/0362246 A1 | 11/2019 | Lin et al. | |
| 2020/0005765 A1 | 1/2020 | Zhou et al. | |
| 2020/0065651 A1 | 2/2020 | Merity et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0160177 A1* | 5/2020 | Durand | G06N 5/04 |
| 2020/0175305 A1 | 6/2020 | Trott et al. | |
| 2020/0193234 A1* | 6/2020 | Pai | G06F 16/904 |
| 2020/0234113 A1 | 7/2020 | Liu | |
| 2020/0272940 A1 | 8/2020 | Sun et al. | |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285993 A1 | 9/2020 | Liu et al. | |
| 2020/0302178 A1 | 9/2020 | Gao et al. | |
| 2020/0334334 A1 | 10/2020 | Keskar et al. | |
| 2020/0364299 A1 | 11/2020 | Niu et al. | |
| 2020/0364542 A1 | 11/2020 | Sun | |
| 2020/0364580 A1 | 11/2020 | Shang et al. | |
| 2020/0372116 A1 | 11/2020 | Gao et al. | |
| 2020/0372319 A1 | 11/2020 | Sun et al. | |
| 2020/0372339 A1 | 11/2020 | Che et al. | |
| 2020/0372341 A1 | 11/2020 | Asai et al. | |
| 2020/0380213 A1 | 12/2020 | Mccann et al. | |
| 2021/0042604 A1 | 2/2021 | Hashimoto et al. | |
| 2021/0049236 A1 | 2/2021 | Nguyen et al. | |
| 2021/0073459 A1 | 3/2021 | Mccann et al. | |
| 2021/0074403 A1* | 3/2021 | Neumann | G16H 50/20 |
| 2021/0089588 A1 | 3/2021 | Le et al. | |
| 2021/0089882 A1 | 3/2021 | Sun et al. | |
| 2021/0089883 A1 | 3/2021 | Li et al. | |
| 2022/0067580 A1* | 3/2022 | Rho | G06F 9/451 |

OTHER PUBLICATIONS

Ghorbani et al., "Data Shapley: Equitable Valuation of Data for Machine Learning," arXiv preprint arXiv:1904.02868, 13 pages, 2019.

Jia et al., "Towards Efficient Data Valuation Based on the Shapley Value," arXiv preprint arXiv:1902.10275, 18 pages, 2019.

\* cited by examiner

700

| Dataset | Pool Size | Coreset (sec) | ADS (sec) | Speedup Factor |
|---|---|---|---|---|
| CIFAR10 | 50k | 663 | 91 | 7.28x |
| TinyImageNet | 100k | 1161 | 261 | 4.44x |
| CINIC10 | 260k | 2720 | 630 | 4.32x |
| SVHN | 500k | 4546 | 554 | 8.20x |
| Cheap-10 | 500k | 4959 | 628 | 7.90x |

*FIG. 7*

METHODS AND SYSTEMS FOR EFFICIENT BATCH ACTIVE LEARNING OF A DEEP NEURAL NETWORK

CROSS-REFERENCE TO RELATED APPLICATIONS

The present application claims priority to and the benefit of the U.S. Provisional Patent Application No. 63/114,467, filed Nov. 16, 2020, titled "Efficient Batch Active Learning Using Data Shapley Valuation," the disclosure of which is hereby incorporated by reference herein in its entirety.

TECHNICAL FIELD

The present disclosure relates generally to machine learning models and neural networks, and more specifically, to batch active learning using predicted contribution of data points to the performance of a neural model.

BACKGROUND

Annotating data, such as training datasets, for use in training neural networks for artificial intelligence applications can be resource intensive and costly. For example, some domains may require massive training datasets for training a neural network while others may require specialized and expensive expertise. Active learning is an approach that is designed to at least partially address challenges related to labeling data, and is achieved by coupling a learning algorithm such as a neural model with an active learner that selects data to be labeled and provides the same to the neural model upon being queried by the neural model as the neural model iteratively trains on the labeled data.

BRIEF DESCRIPTION OF THE DRAWINGS

FIG. 7 shows an example data table illustrating speed performance of batch active learning algorithms that use Shapley data valuations in labeling datasets, according to some embodiments of the present disclosure.

Figure 1:
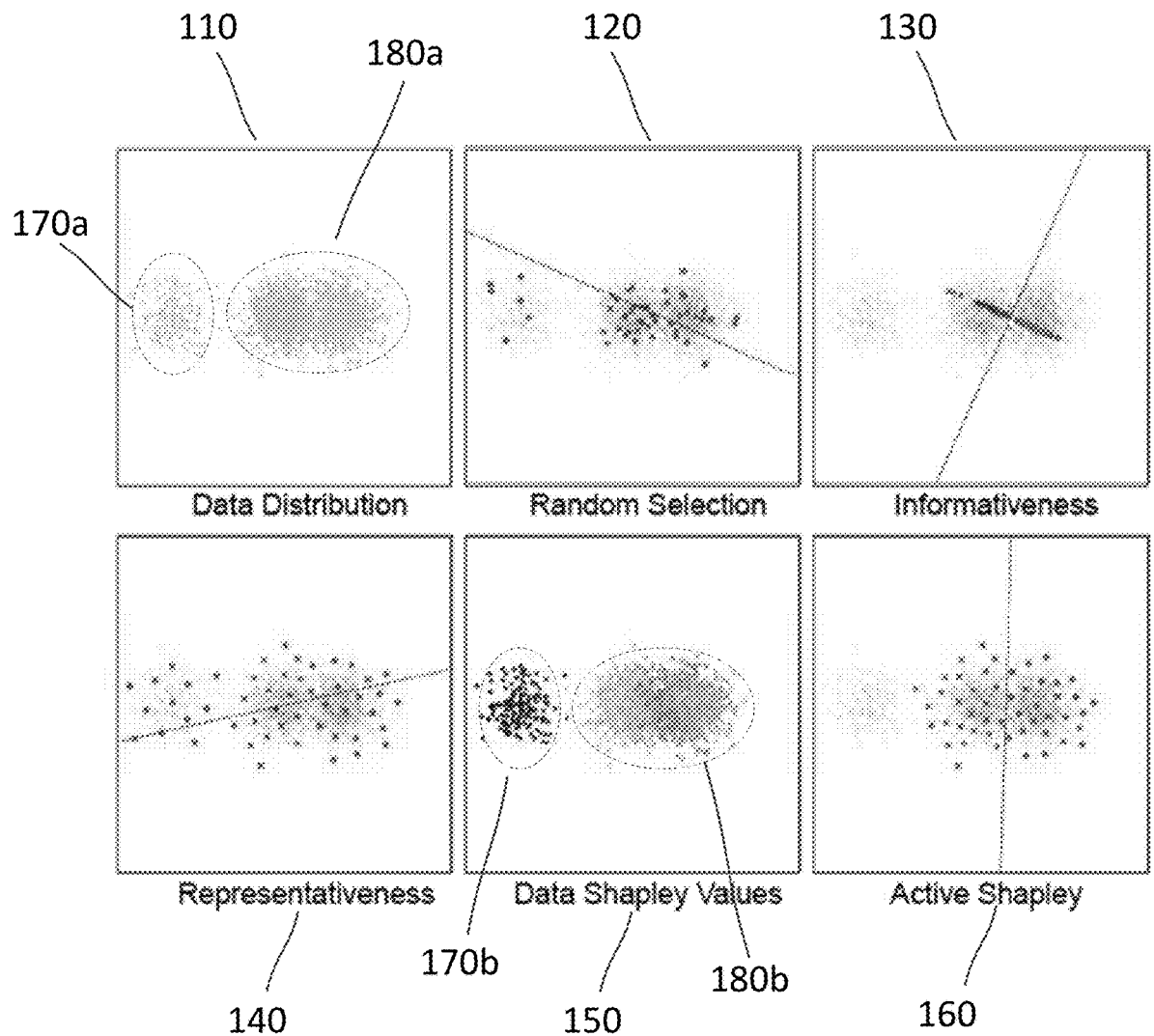
FIG. 1 shows an example illustration of batch active learning with Shapley data valuation, according to some embodiments of the present disclosure.

In the figures and appendix, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

Artificial intelligence, implemented with neural networks and deep learning models, has demonstrated great promise as a technique for automatically analyzing real-world information with or approaching human-like accuracy. In general, such neural network and deep learning models receive input information and perform tasks, such as classification tasks, prediction tasks, etc., based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples as a human might make. Neural network models have been shown to outperform and/or have the potential to outperform other computing techniques in a number of applications.

At least part of the successes of neural network models can be attributed to the use of labelled or annotated datasets to train the models. For various artificial intelligence tasks, such as the above-mentioned classification tasks, prediction tasks, etc., the performance of a neural model can be improved by increasing the number of accurately labeled data points in a training dataset, because the increase allows the neural models to better approximate the true distribution of the test dataset (e.g., from which the labeled training datasets can be drawn). Labeling or annotating training datasets can be, however, challenging. In some cases, the size of the training dataset needed for training a neural model to have a desired model performance can be massive (e.g., object classification tasks), and as such the labeling of the same can be highly cumbersome. In some cases, the labeling of the training dataset may require specialized expertise (e.g., artificial intelligence tasks in medicine), and hence can be expensive. The field of batch active learning is directed to addressing these challenges and allows for the selection of data points for labeling based on the new information content of the data points, i.e., information-based large batch active learning methods, and/or the representativeness of the data points as it relates to the dataset from which the data points are drawn, i.e., representation-based large batch active learning methods.

Information-based and representation-based large batch active learning methods can be, however, independent of the tasks that are being performed by a neural model that is being trained by the data points selected by the noted methods. That is, such methods may not consider the performance of the model, and in particular, the contribution of selected data points to the performance of the neural model when selecting the next batch of data points for labeling and training a neural model. Further, both families of methods can suffer from the diversity problem in the large batch setting, i.e., selecting the most uncertain/informative points to label can result in choosing similar points close to the decision boundary and selecting the most representative points can result in sampling similar points from a high density area of the distribution. Overcoming such a limitation, however, may have several advantages, including but not limited to, reduced computational overhead and substantially faster computational speed, because a large amount of unlabeled data points that are not selected for labeling and training the neural network because of predicted or determined low or non-existent contribution to the performance of the neural network when performing a task. Embodiments of the present disclosure disclose methods and systems that predict the contributions of an unlabeled data to the performance of a neural model and select unlabeled data for labeling (e.g., and also training the neural model) based on the predicted contributions. In some embodiments, the Shapley values of the unlabeled data may be used to express said predicted contributions of the unlabeled data to the performance of the neural model.

In some embodiments, because the incremental value of a training data point to a neural model can vary according to the performance of the neural model on a given task (e.g., prediction task), the performance can be improved or optimized by first estimating or predicting the contribution of unlabeled data points to the task of the neural model and then selecting a diverse subset of the unlabeled data points to be labeled in the next batch based on their contribution. In some instances, the data points in the selected diverse subset may have contribution levels exceeding a threshold contribution level (e.g., the data points may have large contributions to the performance of the neural model at the prediction task). In estimating or predicting the value or contribution of a data point to the performance of a neural model, in some cases, the Shapley value of the data points can be used to select those data points with high contribution that can result in improvements in the performance of the neural model. That is, in some instances, active data Shapley (ADS)-based batch active learning methods that use the Shapley value of data points may be used to select a portion of the data points for labeling and training a neural model. In some cases, active learning methods may include a learning algorithm (e.g., a neural model) that is coupled to an active learner iteratively training on a labeled batch of data, and then querying the active learner to be provided the next best batch of data to be labeled (e.g., and used for further training the neural model).

In some embodiments, ADS-based batch active learning methods for a neural model with a task at hand may be directed to identifying and labeling a given number of data points (e.g., the least number of data points) that may result in some improvement (e.g., the largest amount of improvement) in the performance of the neural model. In some instances, for example when the neural model is a classifier, the output space of the predictions of the neural model can be $y=\{1, \ldots, C\}$. Using D and $D_T$ to annotate the true distribution of training and test data points over X×Y, where X is the space of data points, a training set $\{(x_i, y_i)\}_{i=1}^{n} \sim D$ may include independent and identically distributed (i.i.d.) samples obtained from the training data distribution. In some of the discussions herein, the data points and their index may be used interchangeably, e.g. $N=\{1, \ldots, n\}$ for the training set. In some cases, a learning algorithm A of the ADS-based batch active learning methods can be a black box that takes in a subset of data and outputs a predictive model. For example, learning algorithm A can be equivalent to training a deep convolutional neural network using stochastic gradient descent. In some instances, active learning methods (e.g., of ADS-based batch active learning methods discussed herein) may optimize over a chosen performance metric v (e.g. 0-1 loss), where v(s) may refer to the test performance of a neural model trained on subset s, $v(s):= \mathbb{E}_{(x,y) \sim D_T} v(A(s))$, and $\{(x_i, y_i)\}_{i \in s}$ are subsets of the training data where $s \subseteq N=\{1, \ldots, N\}$. In some cases, the ADS-based batch active learning methods may also include a labelling function o that returns each example's true label: $o(x) = \text{argmax}_{y \in Y} P_D(y|x)$.

In some instances, the active learning methods may include, given a data subset $s^o$ of an initial pool of labeled data points, the learning algorithm training a neural model over several steps where each step may have an associated "labeling budget", i.e., the learning algorithm may query a data labeling function to label B new data points. In some cases, the first step of the active learning methods may be expressed as an optimization problem:

$$\max_{s^1 \subseteq N \setminus s^0 : |b|=B} v(s^0 \cup s^1) \quad (1)$$

In some embodiments, solving Eq. 1 may allow for the determination of a subset of the unlabeled data that is of size B to label, so as to increase (e.g., maximize) the performance of the trained neural model on the test data. Further, similar equations (e.g., similar to Eq. 1 but with $s^o$ replaced with $s^{r-1}$ and $s^1$ replaced with $s^r$) may be solved to determine subset of the unlabeled data that is of size B. In some instances, the active learning algorithm may use the previous batches of labeled data to select B new points for labelling from the remaining unlabeled data points. In some cases, test performance may be approximated using a subset of M data points from the test distribution $$1\left\{\left(x, \frac{v}{j}, y\frac{v}{j}\right)\right\}_{j=1}^m \sim D_T.$$

Solving the afore-mentioned equations such as Eq. 1 can be challenging, because the resulting neural model performance is being estimated or predicted without having the data labels and also because the search space can be combinatorially large.

In some embodiments, predicting the contribution of a training data point to the performance of a neural model, i.e., data valuation, may seek to assign value to the individual training data point. Given a neural model trained on a training dataset and its test performance v(N), determining the contribution of a data point $(x_i, y_i)$ to the neural model performance may include determining $\phi_i$ where $\Sigma_{i=1}^{N} \phi_i = v(N)$—in other words, determining how to divide v(N) among individual data points. In some instances, Shapley values of a data point may be used to represent the contribution $\phi_i$ of that data point. Data Shapley values uniquely satisfy the Shapley equitability axioms: (i) if $(x_i, y_i)$ results in zero change in performance if added to any subset of $[N] \setminus \{i\}$, then it should be given zero value (axiom of null element); (ii) if two distinct data points $(x_i, y_i)$ and $(x_j, y_j)$ result in the same change in performance if added to any subset of $[N] \setminus \{i,j\}$, then they should have equal value (axiom of symmetry); and (iii) if the performance metric $v(\cdot)$ is a linear combination of individual metrics, then the Shapley value should follow the same linearity (axiom of linearity).

In some embodiments, for a data point $z=(x, y)$, the data Shapley value $\phi(z)$ may be expressed as $$\phi(z) = \sum_{i=0}^{N-1} \sum_{s \subseteq N-\{z\}:|s|=i} \frac{v(s \cup \{z\}) - v(s)}{\binom{N-1}{|s|}}. \quad (2)$$

In some instances, the data Shapley value of a data point can be a weighted average of its marginal contribution to the performance of a neural model if the data point is added to most or all possible subsets of training data. The weight may correspond to the number of subsets that have the same size. The data Shapley value of a data point is a measure of the utility of each data point, with a positive (negative) Shapley value indicating a positive (negative) contribution to the performance of the neural model when the data point is included to at least most subsets of the training data. In some instance, the above definition may be applicable (and in some cases, applicable only) to the case where the training dataset is fixed. In machine learning, in some cases, the training data can be an i.i.d realization of the underlying data distribution. In some cases, the data may be obtained from the underlying distribution D, and in such cases, the contribution of a data point to the performance of a neural model may be measured by a distributional Shapley value of the data point, discussed in Amirata Ghorbani, et al., "A distributional framework for data valuation," arXiv:2002.12334 (2020), the disclosure of which is hereby incorporated by reference herein in its entirety.

The distributional Shapley value of a data point is Lipschitz continuous for a large group of learning algorithms. More specifically, if z and z' are similar data points (in a proper metric space), their values may be similar. As such, if the Shapley values for a subset of data points s⊆N are provided, the value of the remaining data points N\s can be estimated by interpolating existing values. In practice, provided $\phi(x_i, y_i)_{i \in S}$, a regression model can be trained to predict the value of a new data point given its covariates and label, which allows for the computation of data Shapley values for the labeled pool. Further, these values can be used to train a regression model that predicts the data Shapley values of an unlabeled data point given its covariates, which allows for the estimation or prediction of the data Shapley values of each unlabeled point in an unlabeled data pool.

Equation 2 above is an exhaustive average of the behavior of a data point in relation to the contribution of the data point to the performance of a neural model, and as such the data Shapley value $\phi(z)$ can serve as a robust indicator said contribution. Provided the data Shapley values of unlabeled data points, in some instances, an approach for solving the optimization problem of Eq. 1 includes reducing the search space to the subset of N that has high values.

FIG. 1 shows an example illustration of such an approach of batch active learning with Shapley data valuation, according to some embodiments of the present disclosure. In some instances, the task to be performed is a binary classification task with a logistic regression model, and plot 110 shows the data distribution of the class "red" that is a mixture of two distributions, a majority group 170a and a minority group 180a of unlabeled data (i.e., class "red" includes data points in the minority group 170a and the right half of the majority group 180a while the left half of the majority group 180a contains class "blue"). Plot 120 shows the training of a model by labelling a random subset of data (darker points) in the majority and minority group, while the rest (lighter points) remain unlabeled. In some cases, plot 130 shows the selection of data points for labeling based on the informativeness of the data point (i.e., choosing data points closest to the boundary in plot 130) may marginally improve model performance at binary classification, while plot 140 shows that selecting data points for labeling based on the representativeness of the data points results in poor performance. In both cases, the failure to improve model performances can be traced to the minority group 170a in the red class. Plot 150 shows the data Shapley values of the data points, which indicates that the data points in the minority group 170b have lower data Shapley values than the data points in the majority group 180b (in plots 110-160, warmer colors indicate higher data Shapley of a point (e.g., red > orange > yellow > blue > purple)). As such, removing the low value points from the search space, i.e., selecting data points at least primarily from the majority group 180b may result in a significant improvement to the performance of the model at the binary classification task (plot 160).

In some embodiments, Eq. 2 may be difficult to solve exactly, and the data Shapley values may be approximated via a truncated Monte Carlo (TMC)-Shapley algorithm by using the following equivalent expression to Eq. 1:

$$\phi(z) = \mathbb{E}_{\pi \sim \Pi}[v(s_\pi^z \cup \{i\}) - v(s_\pi^z)], \quad (3)$$

where $\Pi$ is the set of all permutations of N and $s_\pi^z$ is the set of points that appear before z in permutation $\pi$. Using this form, one can use Monte-Carlo sampling to estimate $\phi(z)$ as follows: sample a permutation of N, go over the sampled permutation one point at a time, train a new model on all the observed points, and truncate once adding a new point results in a small marginal change. In some instances, this may result in one Monte-Carlo sample for the value of every data point in N, and iterating on this process, an arbitrarily accurate approximation of data Shapley values may be obtained.

In some embodiments, implementation of the TMC-Shapley algorithm may be difficult for deep neural networks, because the implementation may require retraining the same model on the order of $O(N^2) \log N$ times, which may be challenging or impractical in the case of deep neural networks. In some instances, a K-Nearest-Neighbor (KNN) model can be used to compute exact Shapley values efficiently using dynamic programming. For example, focusing on the value of points not in their original space (e.g., pixels), but in a learned representation space, the pre-logit layer of a trained deep neural network may be used as a good representation space for the classification problem at hand. In this space, training a simple model (e.g., a KNN-classifier) can result in comparable accuracy to that of the original model. The data Shapley values of a data point can then be computed using the noted method, which determines the contribution of the data point to the prediction performance of the model (e.g., in contrast to the representation learning part which is not determined by the noted method). In some embodiments, a KNN-classifier may also be included along with the learned representation because applying a KNN model on top of a pre-logit layer of a deep network may achieve similar accuracy to that of the model, and also because it allows the application an efficient method that is configured to compute exact Shapley values in linear time, discussed in Ruoxi Ji et al., "Efficient task-specific data valuation for nearest neighbor algorithms," arXiv: 1908.08619 (2019), the disclosure of which is hereby incorporated by reference herein in its entirety.

Computer Environment

Figure 2:
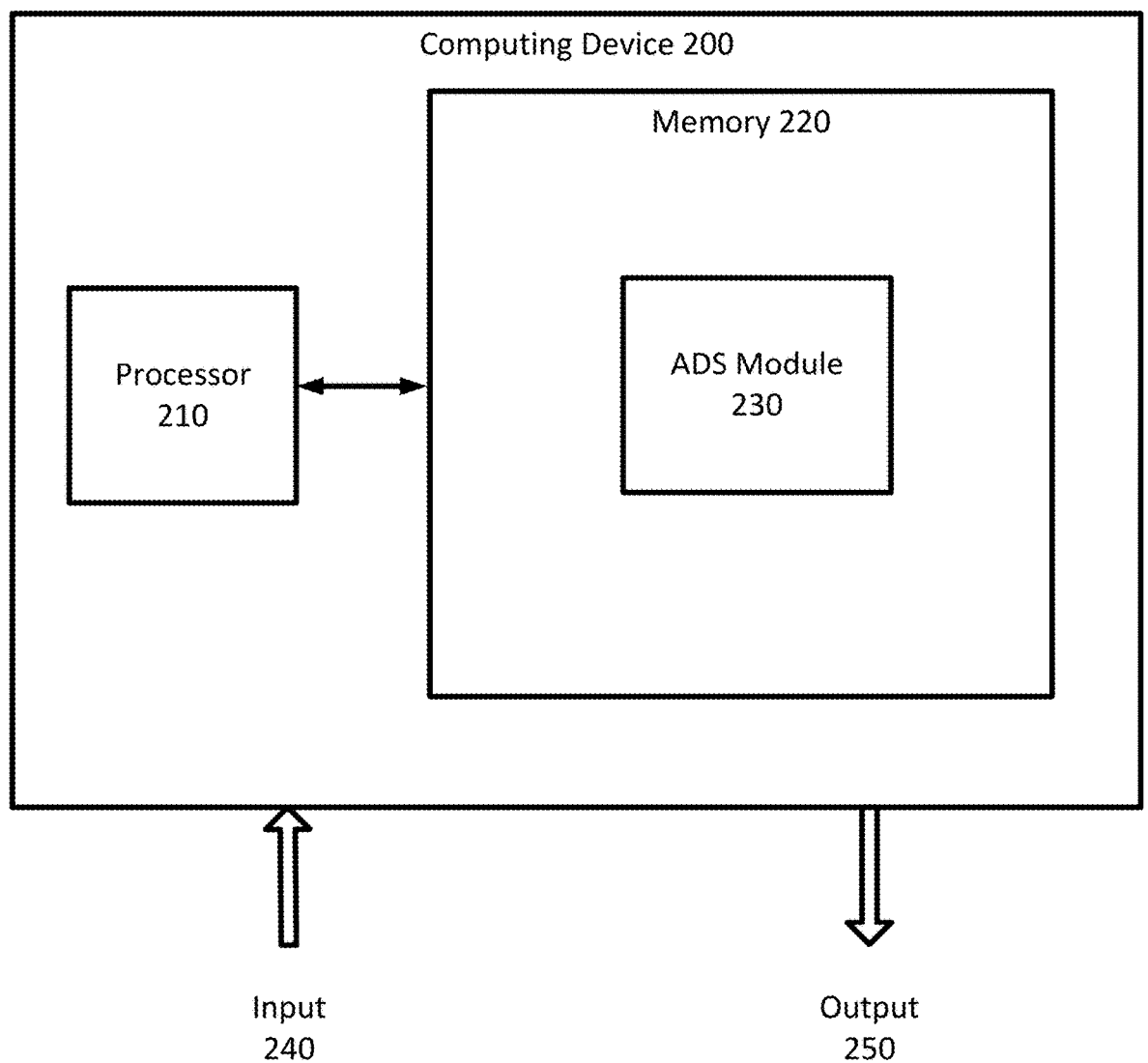
FIG. 2 is a simplified diagram of a computing device, according to some embodiments of the present disclosure.

FIG. 2 is a simplified diagram of a computing device 200 according to some embodiments. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

As shown, memory 220 includes an active data Shapley (ADS) module 230 that may be used to implement and/or emulate the neural network systems and models described further herein and/or to implement any of the methods described further herein, such as but not limited to the methods described with reference to FIGS. 3A-3D and FIG. 4. ADS module 230 may be used, in some examples, for selecting a set of data for labeling to use in training a neural network based on predicted contribution of the data, as measured by the Shapley value of the data, to the performance of the neural network in performing a task.

In some examples, memory 220 may include non-transitory, tangible, machine readable media that includes executable code that when run by one or more processors (e.g., processor 210) may cause the one or more processors to perform the methods described in further detail herein. In some examples, ADS module 230 may be implemented using hardware, software, and/or a combination of hardware and software. As shown, computing device 200 receives input 240, which is provided to ADS module 230, which then may generate output 250.

In some embodiments, the input 240 may include labeled data and unlabeled data, where the contribution of the labeled data towards the performance of a neural model in performing a task is used, for example by the ADS module 230, to predict the contribution, in turn, of the unlabeled data towards the performance of the neural model when the unlabeled data is annotated or labeled and used for training the neural model to perform the task. Examples of labeled data and unlabeled data that may be input 240 to the computing device 200 include "clean" standard datasets as well as "messy" real-world ones. For instance, standard datasets such as but not limited to Canadian Institute for Advanced Research (CIFAR)-10 dataset containing 50,000 32×32 (i.e., tiny) colored images of ten different classes, CINIC-10, Tiny ImageNet, street view house numbers (SVHN) dataset, etc., as well as real-world images (e.g., web-scraped datasets) likely to contain out of distribution, noisy and/or mislabeled examples can be input 240 to the computing device 200.

In some embodiments, the output 250 may include contribution level metric values predicting the contribution of the unlabeled data points to the performance of a neural model when the unlabeled data are annotated, i.e., labeled, and used for training the neural model. That is, for example, the output 250 can be the unlabeled data of the input 240 sorted according to their contribution level metric values. In some instances, the contribution level metric values of the data points can be the Shapley values of the data points. Further, in some cases, the output 250 may include a portion of the sorted or ranked (i.e., ranked according to their contribution level metric values) unlabeled data points. In addition, the output 250 may also include a diverse subset of this portion of the sorted or ranked unlabeled data points selected via a selection algorithm configured to select a diverse subset from a set of data points, as discussed below.

Examples of Batch Active Learning with Shapley Valuation

Figure 3A:
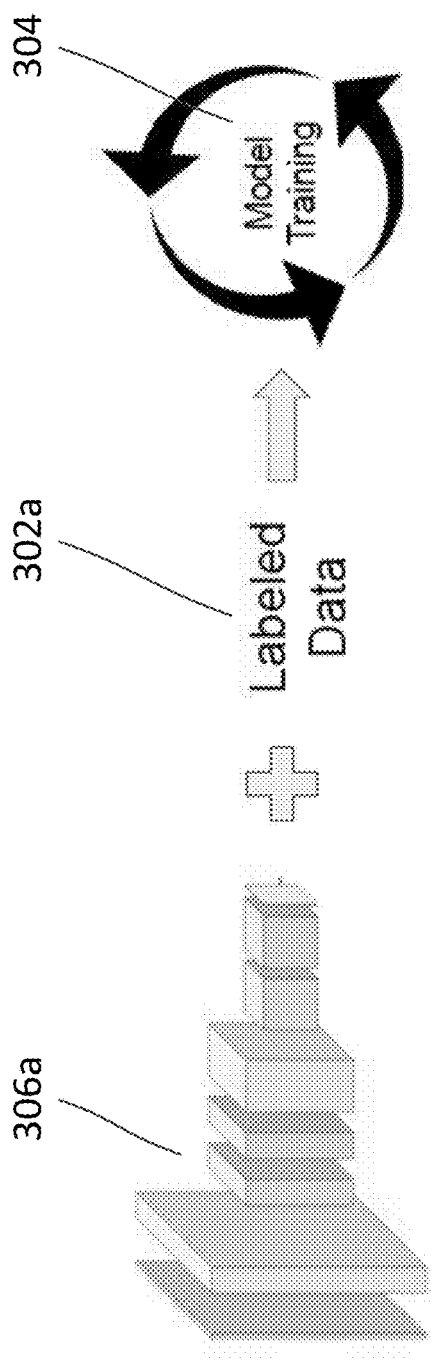
FIGS. 3A-3D show example illustration of a method of batch active learning using Shapley values of data points, according to some embodiments of the present disclosure.

FIGS. 3A-3D show example illustration of a method of batch active learning using Shapley values of data points, according to some embodiments of the present disclosure. With reference to FIG. 3A, in some embodiments, a first subset of data of an unlabeled training dataset may be labeled for use in training a neural model 306 to perform a task. For example, a training dataset of unlabeled data may be received (e.g., by the ADS module 230 of FIG. 2) and a first set of labels for labeling the first subset of data from the training dataset of unlabeled data may also be obtained. In some instances, the labeled first subset of data 302a may then be used to train 304 a deep neural model 306 to yield a representation extractor.

Figure 3B:
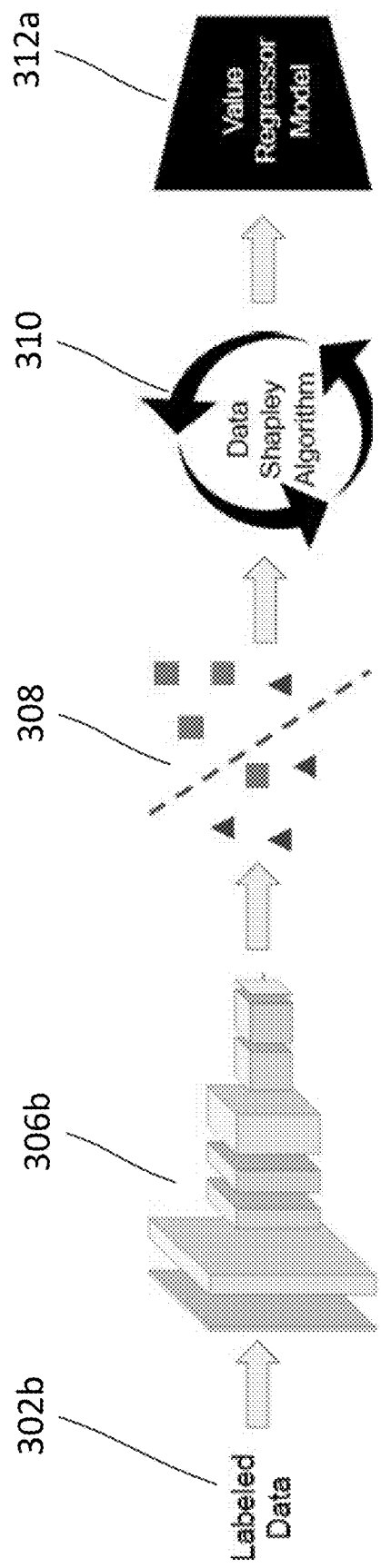

With reference to FIG. 3B, in some instances, the labeled first subset of data 302b may then be provided to the neural model 306b to obtain feature embeddings 308, i.e., extract their representations. That is, the neural model may generate a first set of feature embeddings 308 in feature space corresponding to the first subset of data annotated or labeled with the first set of labels, i.e., the labeled first subset of data 302b. In some cases, a first set of contribution level metric values corresponding to the first subset of data 302b and indicating the contribution levels of the first subset of data 302b to a performance of the neural model 306b when the neural model is to be trained by the first subset of data may be determined 310 using the first set of feature embeddings 308. Further, a regression model 312a may be trained to correlate the first set of contribution level metric values with the first subset of data 302b. An example of contribution level metric values of data can be the Shapley values of the data, and an example of the regression model 312a can be the K-Nearest-Neighbor (KNN) regression model.

Figure 3C:
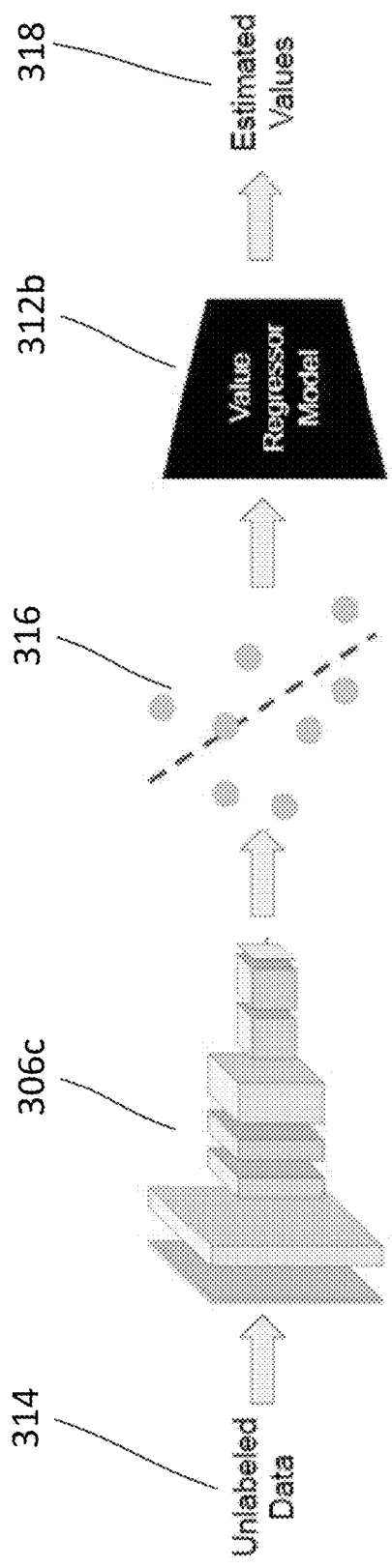
Figure 3D:
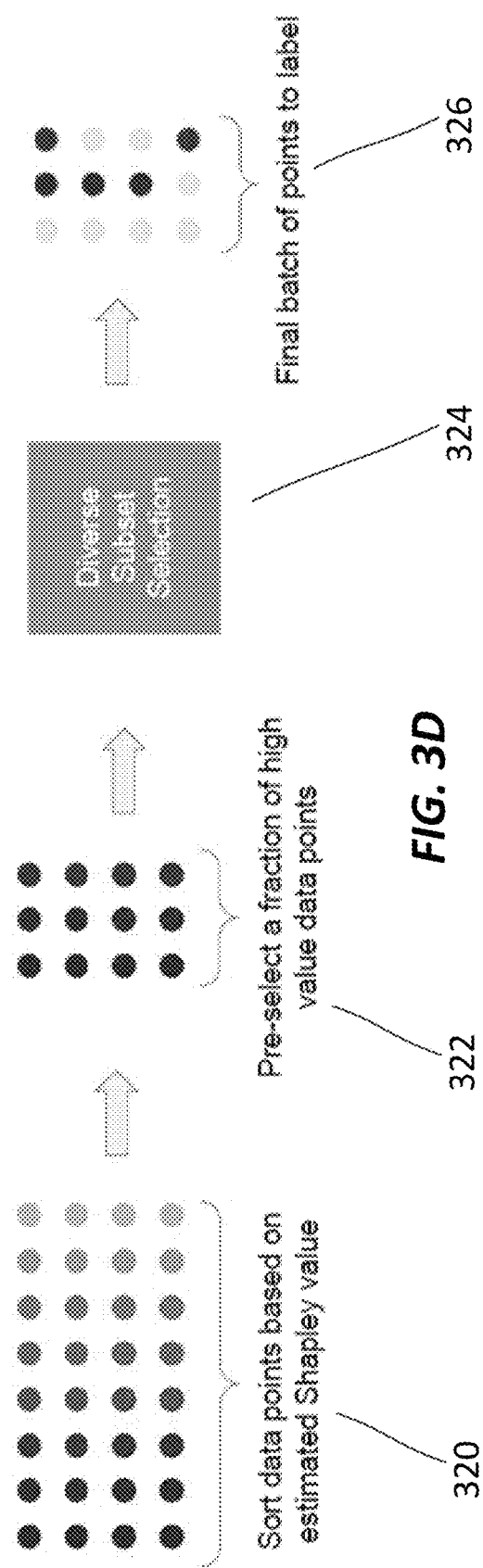

With reference to FIG. 3C, in some instances, a second subset of data may be obtained from the unlabeled training dataset. In some embodiments, the regression model 312a configured to correlate contribution level metric values to subsets of data may then predict or estimate the contribution level metric values of the second subset of data (e.g., exact Shapley value of the second subset of data) to the performance of the neural model for the task at hand, and a portion of the second subset of data may be selected for labelling based in part on this predicted contribution level metric values.

In some embodiments, the second subset of data may be obtained from the unlabeled training dataset, i.e., an unlabeled second subset of data 314, may be provided to the neural model 306c to generate a second set of feature embeddings 316 in feature space that correspond to the unlabeled second subset of data 314. In some instances, a regression model 312b configured to calculate contribution level metric values (e.g., exact Shapley value of the unlabeled second subset of data 314) may be used to predict second set of contribution level metric values 318 using the generated second set of feature embeddings 316. For example, a KNN regression model may be used to compute the exact Shapley values of the unlabeled second subset of data 314 using the second set of feature embeddings 316. That is, with reference to FIG. 3D, the unlabeled second subset of data 320 may have Shapley values associated therewith measuring or identifying their predicted contribution to the performance of the neural model.

In some instances, the trained regression model may include a plurality of trained regression models configured to predict, for each data point of the second subset of data, a plurality of contribution level metric values. In some cases, the contribution level metric value, of the second set of contribution level metric values, corresponding to that data point can equal a maximum value of the plurality of contribution level metric values. In some cases, the contribution level metric value, of the second set of contribution level metric values, corresponding to that data point can equal the average or weighted average of the plurality of contribution level metric values. For example, the task for the neural model may include C classes, in which case C regression models (e.g., C KNN regression models) may be used to data points from each class to predict Shapley values of unlabeled data points. That is, for each unlabeled point $x^u$, the data Shapley value ye for $x^u$ may be predicted, i.e., the C regression models may be used to predict the C possible values of $y_c$. In some instances, because there are multiple Shapley values computed for the same unlabeled point $x^u$, different approaches may be employed to identify a single Shapley value for $x^u$. In some instances, an aggregate Shapley value for ye may be computed, for example, by taking the average, or a weighted average using the model's prediction probability for each class, of the C number of Shapley values determined using the C regression models. In some instances, the single Shapley value for $x^u$ may be the maximum Shapley value of the C number of Shapley values, i.e., the single Shapley value of the data point $x^u = \max_C$ Shapley $((x^u, y_c))$. In some cases, in particular when C is large and as such the determination of the single Shapley value becomes computationally expensive, the number of possible classes for each unlabeled point may be limited.

In some embodiments, upon the computation of the contribution level metric values 318 of the unlabeled second subset of data 314, a portion 322 of the second subset of data 320 that have associated contribution level metric values (e.g., data Shapley values) may be selected based on the contribution level metric values. For example, there may be a threshold contribution level metric value that delineates contribution level metric values which may be considered high enough for the data points that have those values to contribute at least a sufficient amount to the performance of a neural model (e.g., and such the data points may be selected for labeling and training the neural model) from those which may be considered too low for the data points that have those values to contribute at least the sufficient amount to the performance (e.g., and such the data points may not be selected for labeling and training the neural model). In such cases, a portion 322 of the second subset of data 320 that predicted second set of contribution level metric values exceeding the threshold contribution level metric value may be selected for labeling and training the neural model.

In some embodiments, the selection of data points for labeling and training a neural model based on their (e.g., high) contribution level metric values may also be made to increase the diversity between the selected data points. For example, considering an adversarial scenario in which each data point is repeated many times in the unlabeled pool, choosing the data points with the highest contribution level metric values (e.g., the highest Shapley values) may result in choosing repetitions of the high value examples or data points, i.e., the contribution, although high, may be repetitive and as such not as valuable as would have been if the data points were diverse. In some instances, to address this issue, one can pre-select a larger set of points based on their predicted contribution level metric values and then choose a diverse subset from this subset. For example, one can preselect a larger number of data points (e.g., 2-10 times B depending on the size of unlabeled pool) and then use the core-set selection algorithm to select a diverse set of B points. In some instances, data points may be understood to be diverse if their embeddings in feature space are at a large distance from each other.

In some embodiments, as noted above, the second subset of data may be provided to the neural model 306c to generate a second set of feature embeddings 316 in feature space that correspond to the unlabeled second subset of data 314. In some instances, the second set of feature embeddings 316 may be clustered in feature space into multiple clusters, and the separation or distance between a pair of clusters of the multiple clusters may be an indication or a measure of the differences or diversity of the data points of the unlabeled second subset of data 314 that correspond to the pair of clusters of feature embeddings. That is, for example, if a first cluster containing a first feature embedding corresponding to a first data point is at some distance from a second cluster containing a second feature embedding corresponding to a second data point, then the distance or separation between the first cluster and the second cluster may be related to and can be used as a measure or indication of the differences, i.e., the diversity, between the first data point and the second data point (e.g., larger or smaller distances may indicate more or less diversity, respectively). In such cases, to increase the diversity of the data points selected from the portion 322 of the second subset of data 320, one may employ a diverse subset selection algorithm 324 to select the final batch of data points 326 from the portion 322 of the second subset of data 320. In some instances, the selected final batch of data points 326 may include a second portion of the portion 322 of the second subset of data 320, where the second portion includes data points with features embeddings located at different and separated clusters. In other words, the feature embeddings of the selected final batch of data points 326 may be in multiple distanced clusters, which means the selected final batch of data points 326 is a diverse set.

Figure 4:
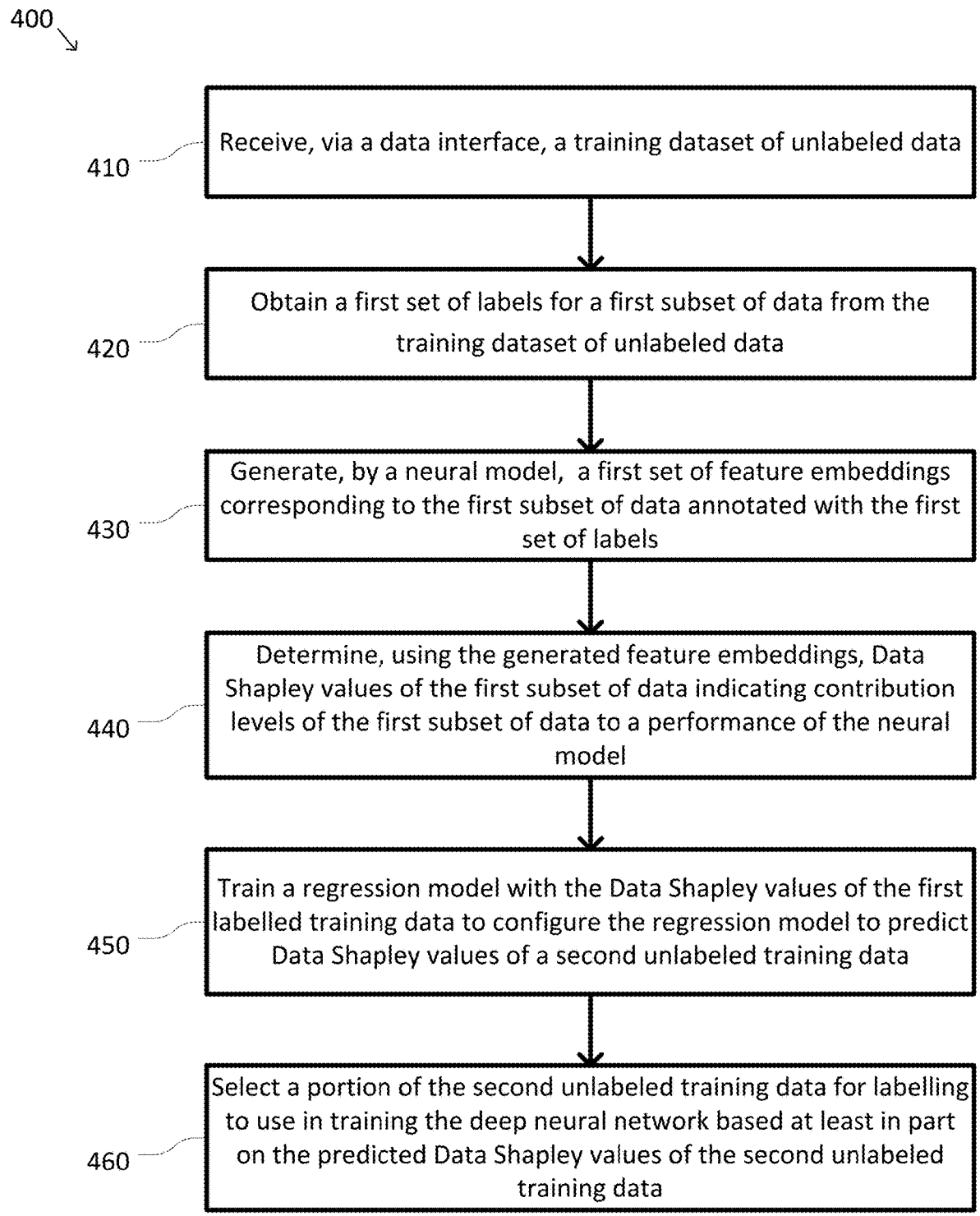
FIG. 4 shows an example flowchart illustrating a method of batch active learning using Shapley values of data points, according to some embodiments of the present disclosure.

FIG. 4 shows an example flowchart illustrating a method of batch active learning using Shapley values of data points, according to some embodiments of the present disclosure. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of ADS module 230 (FIG. 2) to perform a batch active learning using Shapley values of data points.

Referring to FIG. 4, at process 410, the ADS module may receive, via a data interface, a training dataset of unlabeled data. For example, the unlabeled data may be standard datasets of images such as but not limited to CIFAR-10, CINIC-10, Tiny ImageNet, SVHN, which may be at least part of the input 240 shown in FIG. 2.

At process 420, the ADS module may obtain a first set of labels for a first subset of data from the training dataset of unlabeled data. For example, the labels may be identifiers annotated to the data points that identify the classes to which the data points belong. For instance, the labels for subset of unlabeled data from CIFAR-10 may be numbers ranging from 0 to 9 corresponding to the ten classes in CIFAR-10 (e.g., they may be as many labels/numbers as there are data points in the subset of data).

At process 430, the ADS module may generate, by a neural model, a first set of feature embeddings corresponding to the first subset of data annotated with the first set of labels. For example, the feature embeddings may be similar to a first set of feature embeddings 308 shown in FIG. 3B.

At process 440, the ADS module may determine, using the generated feature embeddings, a first set of contribution level metric values corresponding to the first subset of data indicating contribution levels of the first subset of data to a performance of the neural model when the neural model is to be trained by the first subset of data. In some instances, the contribution level metric values of a data point can be the Shapley values of that data point. In such cases, the contribution level metric values or the data Shapley values may be determined according to Equations 2 or 3 as described in relation to the Overview section.

At process 450, the ADS module may train a regression model correlating the first set of contribution level metric values with the first subset of data. In some instances, the regression model can be a KNN model and may be similar to the regression model 312 shown in FIG. 3B.

At process 460, the ADS module may predict, using the trained regression model, a second set of contribution level metric values for a second subset of data from the training dataset of unlabeled data. For example, the second set of contribution level metric values may be similar to the second set of contribution level metric values 318 shown in FIG. 3C.

At process 460, the ADS module may select a portion of the second subset of data for labelling based in part on the predicted second set of contribution level metric values. For example, the selected portion of the second subset of data may be similar to the portion 322 of the second subset of data 320 or the final batch of data points 326 shown in FIG. 3D.

In some embodiments, the first set of contribution level metric values corresponding to the first subset of data and/or the second set of contribution level metric values corresponding to the second subset of data can include Shapley values of the first subset of data and/or Shapley values of the second subset of data, respectively. In some embodiments, the regression model can be a K-Nearest-Neighbors regression model.

In some embodiments, method 400 may further comprise generating, by the neural model, a second set of feature embeddings corresponding to the second subset of data, wherein the predicting includes predicting, using the trained regression model, the second set of contribution level metric values using the generated second set of feature embeddings.

In some embodiments, method 400 may further comprise generating, by the neural model and in feature space, a second set of feature embeddings corresponding to the second subset of data, the second set of feature embeddings clustered into multiple clusters in the feature space, wherein the selecting includes selecting the first portion of the second subset of data based on one or more distances separating the multiple clusters in the feature space.

In some embodiments, method 400 may further comprise identifying a second portion of the second subset of data having the predicted second set of contribution level metric values exceeding a threshold contribution level metric value, wherein the selecting includes selecting the first portion of the second subset of data from the second portion of the second subset of data.

In some embodiments, the trained regression model may include a plurality of trained regression models configured to predict, for each data point of the second subset of data, a plurality of contribution level metric values. In such cases, a contribution level metric value, of the second set of contribution level metric values, may correspond to that data point equals a maximum value of the plurality of contribution level metric values.

Example Performance

FIGS. 5A-5C, 6A-6C and 7 show example results illustrating the performance of batch active learning algorithms or methods that use Shapley data valuations in labeling training datasets, according to some embodiments of the present disclosure. The results in the figures are generated for an image classification task using a WideResNet model (16-8 for character classification tasks and 24-10 for all other experiments), where the initial labeled pool is assumed to contain 5,000 images and additional 5,000 images are labeled at each iteration. The results of the ADS-based batch active learning methods disclosed herein are compared with the results of other baseline algorithms for image classification, such as (i) core-set selection algorithm, a representation-based large batch active learning method that seeks to select the most representative subset of data points, (ii) the entropy algorithm in which high-entropy data points are chosen, and (iii) random algorithm in which examples or data points are selected randomly. In some instances, for the ADS-based batch active learning method, the model is retrained from scratch at each iteration of the active learning acquisition to improve performance. Further, for all algorithms, a small set of 500 test examples are used as a validation set for early stopping and the same validation set is used to approximate the Data Shapley values. The results shown in FIGS. 5A-5C, 6A-6C and 7 are reported on the rest of the test set. The core-set algorithm is discussed in O. Sener and S. Savarese, "Active learning for convolutional neural networks: A core-set approach," arXiv:1708.00489 (2017), the disclosure of which is hereby incorporated by reference herein in its entirety.

Figure 5A:
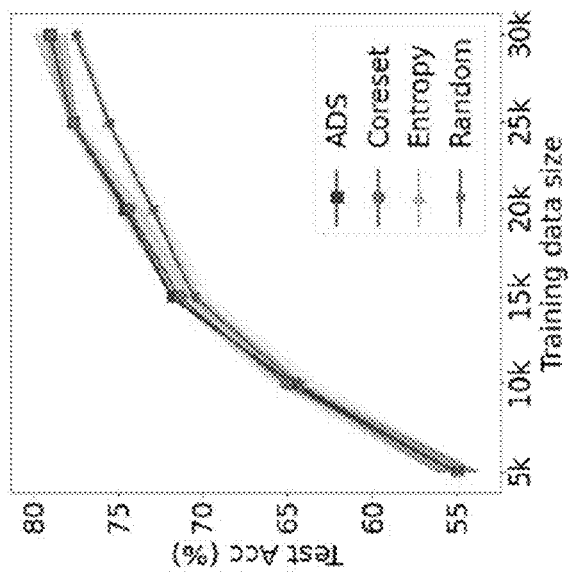
FIGS. 5A-5C show example plots illustrating the performance of batch active learning algorithms that use Shapley data valuations in labeling standard baseline datasets, according to some embodiments of the present disclosure.
Figure 5B:
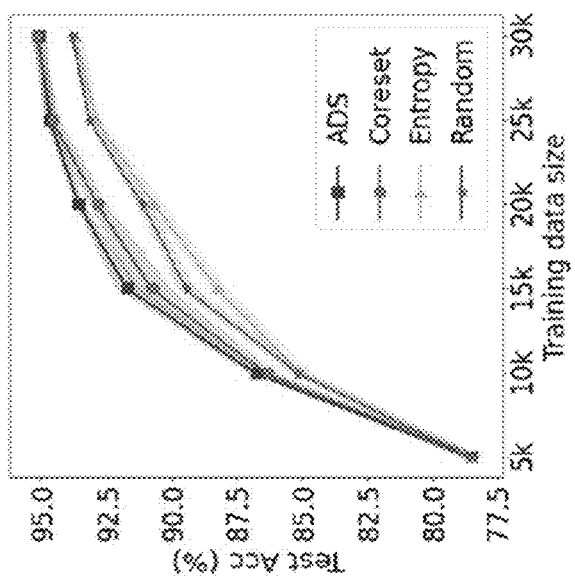
Figure 5C:
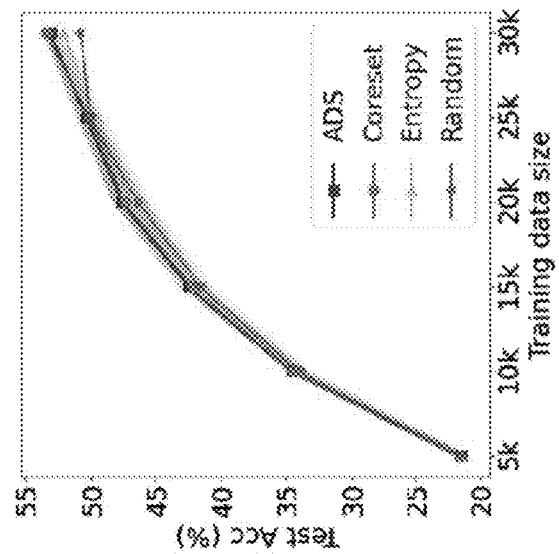

With reference to FIGS. 5A-5C, in some embodiments, the example plots illustrate the performance of batch active learning algorithms that use Shapley data valuations in labeling standard baseline datasets (i.e., "clean" datasets). In the figures, the unlabeled pool of data and the test set both come from the same distribution. The figures show that all the methods, i.e., the ADS-based batch active learning method, the core-set selection method, the entropy method and the random method, converge to similar performance levels as the size of the training dataset increases (i.e., as the number of iterations increase) and that the ADS-based method either matches or outperforms the other methods. As shown in FIG. 7, the ADS-based method performs about one order of magnitude faster than any of the other methods.

In some embodiments, three baseline datasets are used in obtaining the results of FIGS. 5A-5C, the CIFAR-10 dataset containing 50,000 tiny (32×32) colored images of 10 objects (FIG. 5A), the CINIC-10 dataset which is a variant of the CIFAR-10 in that CINIC-10 contains the same 10 classes as CIFAR-10 but comes from two different sources (i.e., 50,000 of its images come from CIFAR-10 images and 200,000 images come from ImageNet, from the same 10 classes) (FIG. 5B), and the Tiny ImageNet dataset which has 100,000 images from 200 different object classes (FIG. 5C). In some instances, CINIC-10 is used to illustrate the scenario where the unlabeled pool is larger and the data is more diverse, and Tiny ImageNet is used as a third dataset to investigate the scenario of having a larger number of classes.

As noted above, in some embodiments, FIG. 5A shows results comparing the performances of the ADS-based batch active learning method, the core-set selection method, the entropy method and the random method when the baseline dataset used is the CIFAR-10 dataset. FIG. 5B and FIG. 5C show results comparing the performances of same methods when the baseline dataset used are the CINIC-10 dataset and the Tiny ImageNet dataset, respectively. For CIFAR-10 dataset, the bottom 80% of the unlabeled data points with lowest value are removed while for CINIC-10 dataset and the Tiny ImageNet dataset, the bottom 90% of the unlabeled data points with lowest value are removed. The figures show that the ADS-based batch active learning method outperforms all the other considered methods including the best competing method, the core-set selection method. Further, as shown in FIG. 7, the ADS-based batch active learning method consistently performs faster than the other methods (e.g., because a large portion of the unlabeled data with a small computational overhead is removed).

Figure 6A:
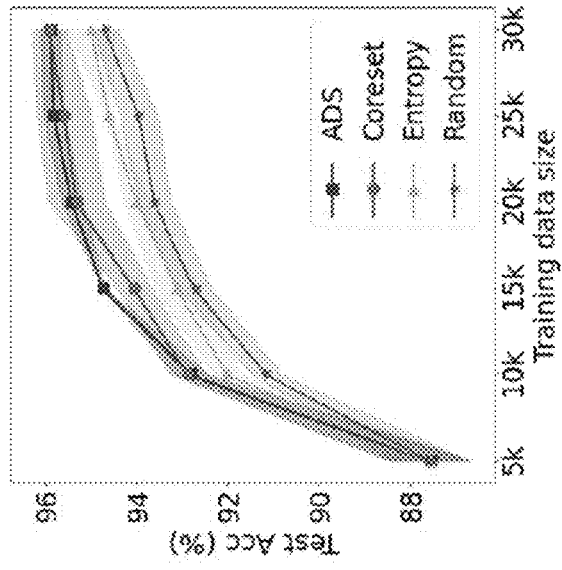
FIGS. 6A-6C show example plots illustrating the performance of batch active learning algorithms that use Shapley data valuations in labeling real-world datasets, according to some embodiments of the present disclosure.
Figure 6B:
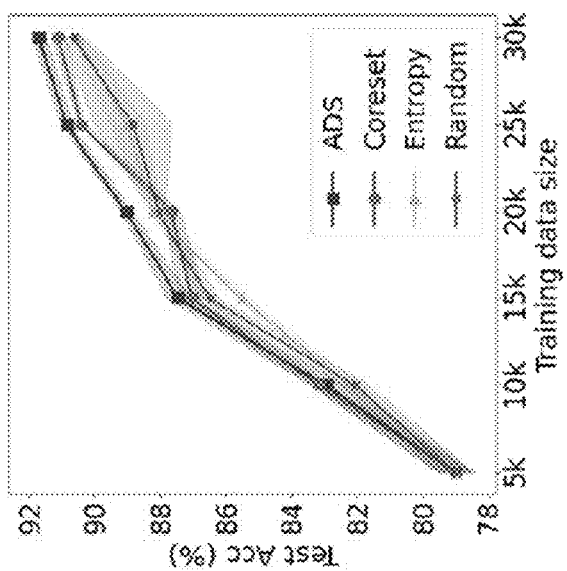
Figure 6C:
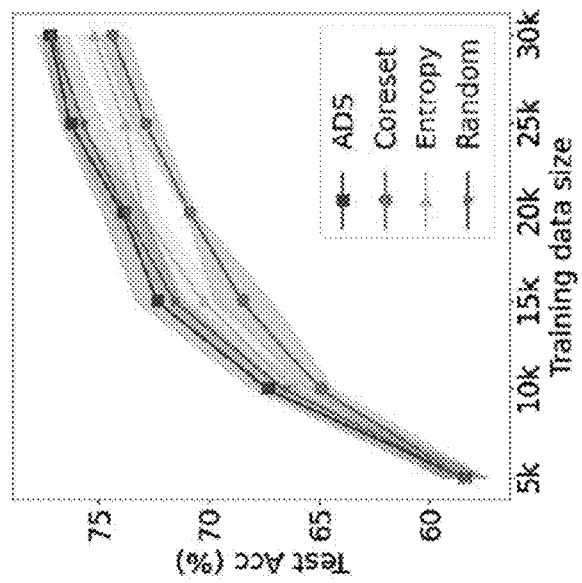

With reference to FIGS. 6A-6C, in some embodiments, the example plots illustrate the performance of batch active learning algorithms that use Shapley data valuations in labeling real-world datasets (i.e., "messy" datasets). In real-world scenarios, labeled data and unlabeled data are unlikely to originate from the same exact distribution, and the data are likely to be corrupted by noise, distortions, etc. (for example because unlabeled data usually come from a low-quality source). In such cases, active learning can be used to reduce the cost of gathering data by the careful selection of the best data points from a large pool of unlabeled low-quality dataset.

In some embodiments, the datasets used in obtaining the results of FIGS. 6A-6C include CIFAR-10, CINIC-10, SVHN dataset, which contains more than 70,000 colored images for the task of digit classification and a further set of over 500,000 images that are used to mimic the realistic or real-world scenario of having a large unlabeled pool, and a web-scraped dataset ("Cheap-10") designed to investigate the real-world setting of gathering a large pool of unlabeled data points quickly and inexpensively. The web-scraped or Cheap-10 dataset was obtained by conducting searches using the Bing search engine for terms that correspond to the titles of each class in CIFAR-10 (e.g., "convertible car"). The Cheap-10 dataset contained about 500,000 images (i.e., about ten times that of CIFAR-10), a combination of valid images as well as out of distribution, noisy, and mislabeled images or examples (e.g., for instance, a large number of the images corresponded to out of task and out of distribution images such as car brand logo for the car class).

In some embodiments, FIGS. 6A-6C show the results of three experiments performed to investigate real-world or "messy" scenarios with the above-mentioned datasets, a domain shift scenario where CINIC-10 serves as the unlabeled data pool while performance is measured on CIFAR-10 (FIG. 6A), a noisy scenario where unlabeled SVHN data is partially corrupted and performance is measured on SVHN (FIG. 6B) and a low-quality source scenario where the Cheap-10 dataset serves as the unlabeled data pool while performance is measured on CIFAR-10, simulating a weakly labeled training scenario (FIG. 6C). The figures show that the ADS-based batch active learning method outperforms all the other considered methods, the core-set selection method, the entropy method and the random method, in all three experiments (and the random method being the next best method for the low-quality source scenario), illustrating using Shapley values of data points (i.e., images in this case) allows for the removal of data points that have low estimated or predicted value from the training dataset, and as such allows for the reduction of the search space to the set of data points (e.g., images) that are expected to contribute to the performance of the neural model with the test data.

FIG. 7 shows an example data table 700 illustrating speed performance of batch active learning algorithms that use Shapley data valuations in labeling datasets, according to some embodiments of the present disclosure. In some instances, the data table 700 shows a comparison of the run-time of ADS-based batch active learning method to that of the coreset method for the first iteration of active learning using data from CIFAR-10, CINIC-10, Tiny ImageNet, SVHN, and Cheap-10 datasets as unlabeled pools. In most cases, as the unlabeled pool gets larger, i.e., as the pool size increases, the ADS-based batch active learning method can save more time. Further, in all the cases, ADS-based batch active learning method is a factor of four to eight times faster than the coreset method. It is to be noted that reported times for ADS-based batch active learning method include the time it takes to regress and predict the Shapley values.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for batch active learning, the method comprising:
   receiving, via a data interface, a training dataset of unlabeled data;
   obtaining a first set of labels for a first subset of data from the training dataset of unlabeled data;

generating, by a neural model, a first set of feature embeddings corresponding to the first subset of data annotated with the first set of labels;

determining, using the generated first set of feature embeddings, a first set of contribution level metric values corresponding to the first subset of data indicating contribution levels of the first subset of data to a performance of the neural model when the neural model is to be trained by the first subset of data;

training a regression model by correlating the first set of contribution level metric values with the first subset of data to predict a contribution level that an unlabeled training data item contributes to the performance of the neural model when the neural model is to be trained by the unlabeled training data item;

predicting, using the trained regression model, a second set of contribution level metric values for a second subset of data from the training dataset of unlabeled data; and selecting a first portion of the second subset of data for labelling based in part on the predicted second set of contribution level metric values.

2. The method of claim 1, wherein the first set of contribution level metric values corresponding to the first subset of data and/or the second set of contribution level metric values corresponding to the second subset of data include Shapley values of the first subset of data and/or Shapley values of the second subset of data, respectively.

3. The method of claim 1, wherein the regression model is a K-Nearest-Neighbors regression model.

4. The method of claim 1, further comprising generating, by the neural model, a second set of feature embeddings corresponding to the second subset of data, wherein:

the predicting includes predicting, using the trained regression model, the second set of contribution level metric values using the generated second set of feature embeddings.

5. The method of claim 1, further comprising generating, by the neural model and in feature space, a second set of feature embeddings corresponding to the second subset of data, the second set of feature embeddings clustered into multiple clusters in the feature space, wherein:

the selecting includes selecting the first portion of the second subset of data based on one or more distances separating the multiple clusters in the feature space.

6. The method of claim 5, further comprising identifying a second portion of the second subset of data having the predicted second set of contribution level metric values exceeding a threshold contribution level metric value, wherein:

the selecting includes selecting the first portion of the second subset of data from the second portion of the second subset of data.

7. The method of claim 1, wherein the trained regression model includes a plurality of trained regression models configured to predict, for each data point of the second subset of data, a plurality of contribution level metric values, a contribution level metric value, of the second set of contribution level metric values, corresponding to that data point equals a maximum value of the plurality of contribution level metric values.

8. A system, comprising:
a non-transitory memory storing instructions; and
one or more hardware processors coupled to the non-transitory memory and configured to read the instructions from the non-transitory memory to cause the system to perform operations comprising:

receiving, via a data interface, a training dataset of unlabeled data;

obtaining a first set of labels for a first subset of data from the training dataset of unlabeled data;

generating, by a neural model, a first set of feature embeddings corresponding to the first subset of data annotated with the first set of labels;

determining, using the generated first set of feature embeddings, a first set of contribution level metric values corresponding to the first subset of data indicating contribution levels of the first subset of data to a performance of the neural model when the neural model is to be trained by the first subset of data;

training a regression model by correlating the first set of contribution level metric values with the first subset of data to predict a contribution level that an unlabeled training data item contributes to the performance of the neural model when the neural model is to be trained by the unlabeled training data item;

predicting, using the trained regression model, a second set of contribution level metric values for a second subset of data from the training dataset of unlabeled data; and selecting a first portion of the second subset of data for labelling based in part on the predicted second set of contribution level metric values.

9. The system of claim 8, wherein the first set of contribution level metric values corresponding to the first subset of data and/or the second set of contribution level metric values corresponding to the second subset of data include Shapley values of the first subset of data and/or Shapley values of the second subset of data, respectively.

10. The system of claim 8, wherein the regression model is a K-Nearest-Neighbors regression model.

11. The system of claim 8, wherein the operations further comprise generating, by the neural model, a second set of feature embeddings corresponding to the second subset of data, wherein:

the predicting includes predicting, using the trained regression model, the second set of contribution level metric values using the generated second set of feature embeddings.

12. The system of claim 8, wherein the operations further comprise generating, by the neural model and in feature space, a second set of feature embeddings corresponding to the second subset of data, the second set of feature embeddings clustered into multiple clusters in the feature space, wherein:

the selecting includes selecting the first portion of the second subset of data based on one or more distances separating the multiple clusters in the feature space.

13. The system of claim 12, wherein the operations further comprise identifying a second portion of the second subset of data having the predicted second set of contribution level metric values exceeding a threshold contribution level metric value, wherein:

the selecting includes selecting the first portion of the second subset of data from the second portion of the second subset of data.

14. The system of claim 8, wherein the trained regression model includes a plurality of trained regression models configured to predict, for each data point of the second subset of data, a plurality of contribution level metric values, a contribution level metric value, of the second set of contribution level metric values, corresponding to that data point equals a maximum value of the plurality of contribution level metric values.

15. A non-transitory computer-readable medium (CRM) having stored thereon computer-readable instructions executable to cause a processor to perform operations comprising:
- receiving, via a data interface, a training dataset of unlabeled data;
- obtaining a first set of labels for a first subset of data from the training dataset of unlabeled data;
- generating, by a neural model, a first set of feature embeddings corresponding to the first subset of data annotated with the first set of labels;
- determining, using the generated first set of feature embeddings, a first set of contribution level metric values corresponding to the first subset of data indicating contribution levels of the first subset of data to a performance of the neural model when the neural model is to be trained by the first subset of data;
- training a regression model by correlating the first set of contribution level metric values with the first subset of data to predict a contribution level that an unlabeled training data item contributes to the performance of the neural model when the neural model is to be trained by the unlabeled training data item;
- predicting, using the trained regression model, a second set of contribution level metric values for a second subset of data from the training dataset of unlabeled data; and
- selecting a first portion of the second subset of data for labelling based in part on the predicted second set of contribution level metric values.

16. The non-transitory CRM of claim 15, wherein the first set of contribution level metric values corresponding to the first subset of data and/or the second set of contribution level metric values corresponding to the second subset of data include Shapley values of the first subset of data and/or Shapley values of the second subset of data, respectively.

17. The non-transitory CRM of claim 15, wherein the regression model is a K-Nearest-Neighbors regression model.

18. The non-transitory CRM of claim 15, wherein the operations further comprise generating, by the neural model, a second set of feature embeddings corresponding to the second subset of data, wherein:
- the predicting includes predicting, using the trained regression model, the second set of contribution level metric values using the generated second set of feature embeddings.

19. The non-transitory CRM of claim 15, wherein the operations further comprise generating, by the neural model and in feature space, a second set of feature embeddings corresponding to the second subset of data, the second set of feature embeddings clustered into multiple clusters in the feature space, wherein:
- the selecting includes selecting the first portion of the second subset of data based on one or more distances separating the multiple clusters in the feature space.

20. The non-transitory CRM of claim 19, wherein the operations further comprise identifying a second portion of the second subset of data having the predicted second set of contribution level metric values exceeding a threshold contribution level metric value, wherein:
- the selecting includes selecting the first portion of the second subset of data from the second portion of the second subset of data.

21. The non-transitory CRM of claim 15, wherein the trained regression model includes a plurality of trained regression models configured to predict, for each data point of the second subset of data, a plurality of contribution level metric values, a contribution level metric value, of the second set of contribution level metric values, corresponding to that data point equals a maximum value of the plurality of contribution level metric values.

* * * * *